J. P. MUTH.
LIQUID MEASURING, MIXING, AND DISPENSING APPARATUS.
APPLICATION FILED DEC. 28, 1905. RENEWED SEPT. 5, 1908.

921,870.

Patented May 18, 1909.
3 SHEETS—SHEET 1.

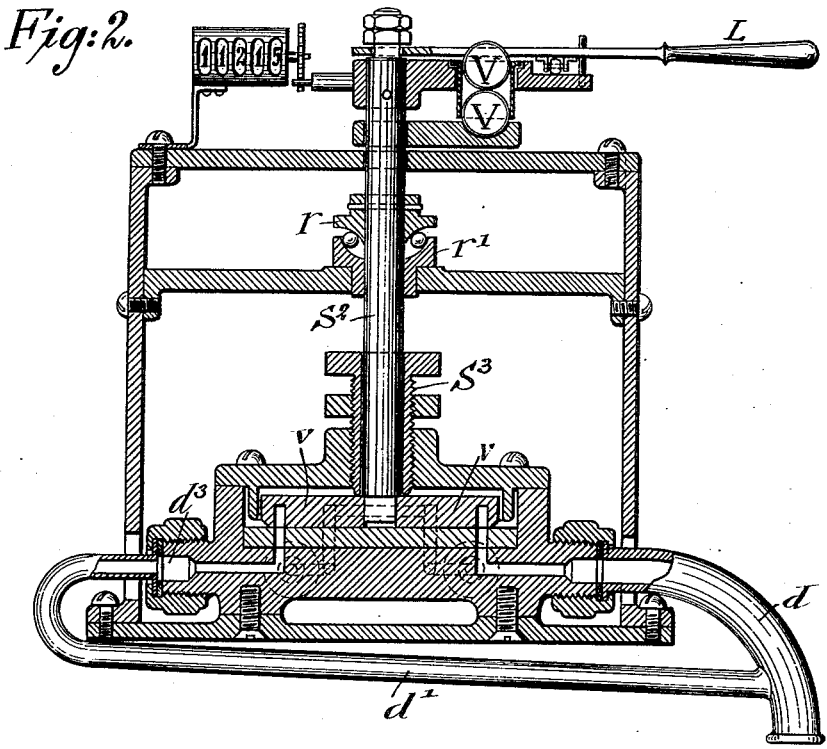
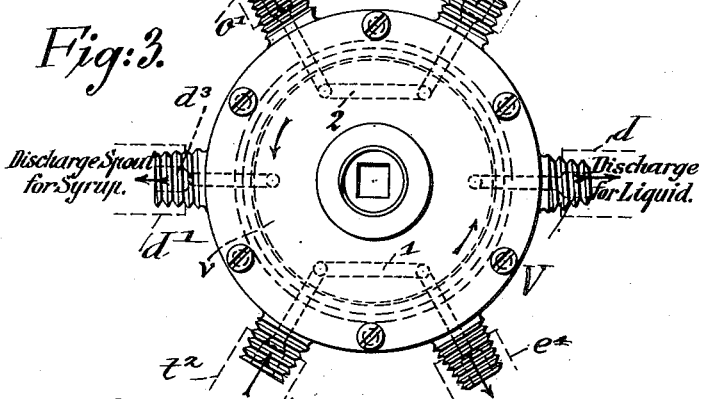

J. P. MUTH.
LIQUID MEASURING, MIXING, AND DISPENSING APPARATUS.
APPLICATION FILED DEC. 28, 1905. RENEWED SEPT. 5, 1908.

921,870.

Patented May 18, 1909.
3 SHEETS—SHEET 3.

UNITED STATES PATENT OFFICE.

JOHN P. MUTH, OF JERSEY CITY, NEW JERSEY, ASSIGNOR OF ONE-THIRD TO ARTHUR E. GRIFFITH, OF JERSEY CITY, NEW JERSEY.

LIQUID MEASURING, MIXING, AND DISPENSING APPARATUS.

No. 921,870.   Specification of Letters Patent.   Patented May 18, 1909.

Application filed December 28, 1905, Serial No. 293,652. Renewed September 5, 1908. Serial No. 451,855.

*To all whom it may concern:*

Be it known that I, JOHN P. MUTH, a citizen of the United States, residing in Jersey City, in the county of Hudson and State of New Jersey, have invented certain new and useful Improvements in Liquid Measuring, Mixing, and Dispensing Apparatus, of which the following is a specification.

This invention has reference to certain improvements in liquid measuring, mixing and dispensing apparatus by which predetermined quantities of carbonated or other liquid may be prepared, measured and dispensed; and for this purpose the invention consists of a liquid measuring, mixing and dispensing apparatus which comprises a discharge-spout, a source of liquid under pressure connecting with said spout, a valve controlling said supply of liquid in connection with a measuring cup and a syrup supply vessel, and means for operating the valve-connection so as to supply the necessary quantity of liquid and syrup to the discharge-spout.

The invention consists further of certain additional details of construction and combinations of parts which will be fully described hereinafter and finally pointed out in the claims.

Figure 1:
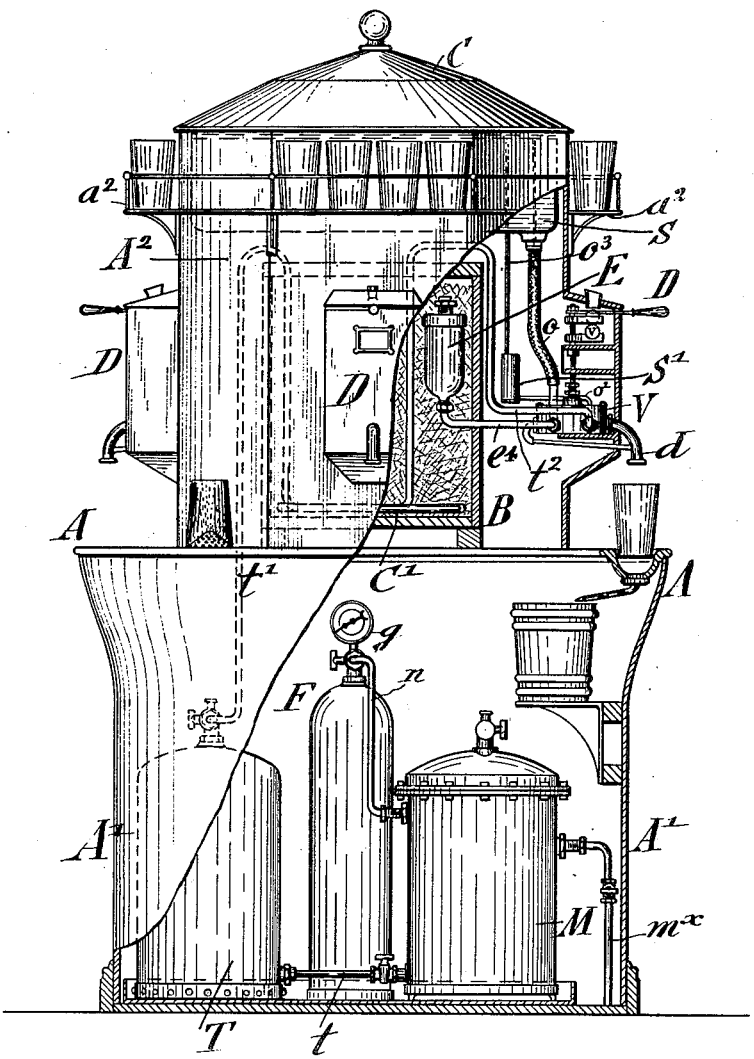
Figure 4:
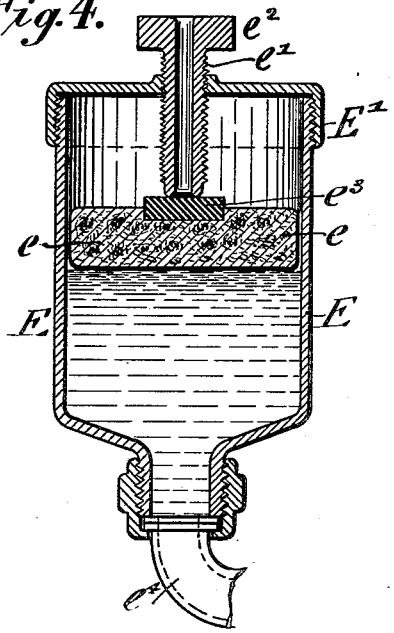
Figure 5:
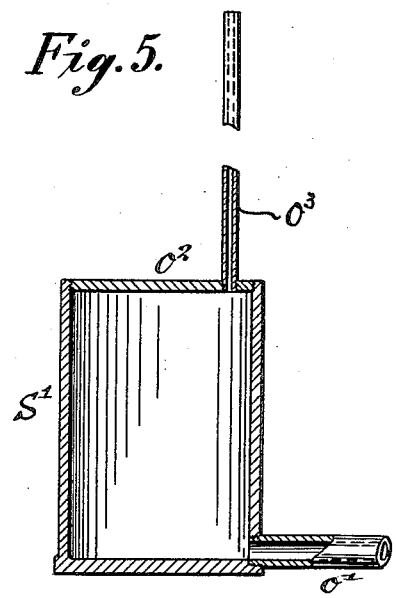
Figure 6:
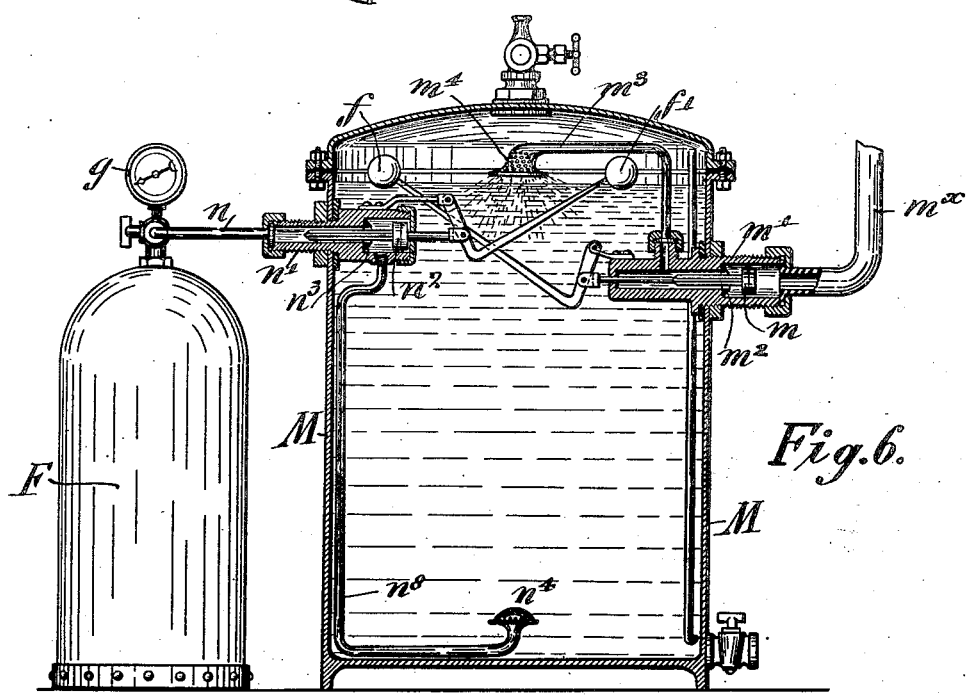

In the accompanying drawings, Figure 1 represents a side-elevation, partly in section, of my improved apparatus, Fig. 2 is a detail vertical central section, drawn on a larger scale, of the valve-connection with the liquid supply vessel, measuring cup and syrup supply vessel, Fig. 3 is a plan-view of the valve shown in Fig. 2, Fig. 4 is a detail vertical central section of the liquid measuring cup, Fig. 5 is a vertical central section through the syrup measuring vessel, and Fig. 6 is a vertical central section through the mixing-tank for automatically charging the liquid with carbonic acid gas.

Similar characters of reference indicate corresponding parts in the different figures of the drawings.

Referring to the drawings, A indicates an exterior housing or case of wood or other suitable material which forms an inclosure and support for the various parts of the improved apparatus. The case is preferably arranged in cylindrical shape in such a manner that in the lower part $A^1$ of the same the fountain containing the liquid carbonic acid gas and the mixing-vessel or carbonator in which the water is mixed with the carbonic acid gas automatically, so as to be supplied to the measuring and dispensing devices, are located.

On the lower part $A^1$ of the casing A is arranged a shelf for the tumblers and waste-pipes for drawing off the liquid into suitable buckets in the lower part $A^1$ of the casing A. The upper cylindrical portion $A^2$ of the casing A incloses a cooling-box B with a cooling-coil $C^1$, which box is filled with broken ice in any suitable manner, and connected with four dispensing devices D arranged equidistantly about the circumference of the cylindrical casing $A^1$.

On the upper part of the casing is arranged a shelf $a^2$ for supporting tumblers for the convenient use of the parties who desire to draw some of the corbonated liquid, and vessels, one for each dispensing apparatus, for containing syrup, if soda-water is to be dispensed. The syrup-connection may be cut off and the apparatus used simply for dispensing carbonated water, if desired.

The cylindrical casing $A^2$ is surmounted by a removable cover C, which gives access to the interior of the apparatus in order to supply the cooling-box B with ice and get at the interior parts for adjustment and repairs.

The mixing-tank or carbonator M in the lower part $A^1$ of the casing A is shown in detail in Fig. 6. It is connected with a pipe $m^x$ for supplying the water to be carbonated. It is also connected by a pipe $n$ with the fountain or receiver F which contains carbonic acid gas under sufficient pressure to charge the liquid supplied to the mixing-tank M. The water supply pipe $m^x$ is provided with a valve $m$, which is moved in a casing $m^1$, the stem of the valve being connected with a fulcrumed stem of a float $f$ which serves to close the valve $m$ on its seat $m^2$ as soon as a certain height of level of the liquid in the mixing-tank M is reached. The outlet of the cylindrical casing $m^1$ is connected by a pipe $m^3$ with a rose $m^4$, which is located in the upper part of the mixing-tank M. The carbonic acid fountain F is provided with a pressure-gage $g$ and is connected by the supply-pipe $n$ with a casing $n^1$ in which a valve $n^2$ is arranged, the stem of said valve being connected with a fulcrumed lever of a float $f^1$ which automatically closes the valve $n^2$ on its seat $n^3$ as soon as the liquid falls to a certain level and thereby shuts off the supply of gas. The outlet-opening in the valve $n^2$ is connected with a pipe $n^3$ in the lower part of the mixing-tank M, which discharges the carbonic acid gas through a rose $n^4$ so that such gas percolates through and charges the liquid above the same. From the mixing tank M the carbonated liquid is conducted into a supply-tank T by a valved pipe $t$ which connects the lower part of the mixing-tank M with the supply-tank T. The mixing-tank is provided with a valved outlet-nozzle at its upper end so as to permit the escape of the carbonic acid gas from the upper part of the tank when there is an over-pressure.

The supply-tank T is connected by a valved pipe $t^1$ with a cooling-coil $C^1$ that is arranged in the bottom of the box B, the inner end of said cooling-coil being connected by a pipe $t^2$, which extends over the cover of the cooling-box, to one of the ports of the valve-connection V which is arranged close to the discharge-spout $d$ of the dispensing device D.

In the cooling-box B are arranged as many measuring cups E as there are dispensing devices arranged in the upper part of the casing $A^2$. Each measuring cup E is provided with a float $e$ made of cork or other suitable material, and in its cover with an adjustable vent-pipe $e^1$ which is provided with a head for conveniently setting the threaded vent-pipe in the cover $E^1$ of the measuring cup E. The float $e$ is provided at its center with a soft rubber block $e^3$ which closes the lower inner end of the vent-pipe $e^1$ when the required quantity of liquid has filled the measuring cup E. By adjusting the height of the vent-pipe in the cover, the quantity of liquid can be increased or decreased, so as to control thereby the quantity of liquid to be dispensed at one operation of the dispensing device. One of the ports of the valve-connections V is connected by a pipe $e^4$ with the lower part of the measuring cup, so that the carbonated liquid, after being supplied by the pipe $t^2$, is supplied to the ports and channel in the valve-connection, to the measuring cup, until the required quantity is permitted to pass into the same, when the float $e$ closes the lower end of the vent-pipe $e'$. The dispensing apparatus is then ready for dispensing the liquid forced into the measuring cup. Simultaneously the syrup, if such should be desired to be mixed with the carbonated liquid, is conducted from the syrup bottle or vessel S through connecting-pipe $o$, into one port of the valve-connection V, to an interior channel of the same to a second connecting-pipe $o^1$, into the syrup measuring cup $S^1$, which is shown on a large scale in Fig. 5. The upper end $o^2$ of the syrup-measuring vessel is connected with a pipe $o^3$ with the upper part of the syrup-tank, above the liquid, so as to supply the required vent when a quantity of syrup in the syrup measuring vessel is drawn off. The discharge-spout $d$ is connected by a branch-pipe $d^1$ with a port $d^3$ of the valve-connection V at a point diametrically opposite its connection with the same, so as to supply the carbonated liquid through the spout, while the syrup is supplied by the branch-pipe $d^1$ to the discharge-spout $d$ so as to be mixed with the liquid discharged into the vessel.

The valve-connection V is formed of a cylindrical casing which is provided at the interior with a disk $v$ that is attached to the lower end of an upright shaft $S^2$, which passes through a stuffing-box $S^3$ on the cover of the valve-casing $V^1$. The valve-casing is provided with six nipples, which are arranged equidistantly from each other in radial direction to the axis of the shaft $S^2$, said screw-nipples serving for making the different connections with the pipes leading to the liquid supply tank, measuring vessel, syrup vessel, syrup measuring vessel, and discharge-spout. The ports of two adjacent pairs of nipples are connected with connecting-channels 1 and 2 arranged in the disk $v$, said channels being clearly shown in Figs. 2 and 3. The ports of the remaining two nipples, which are arranged at diametrically opposite points on the valve-casing, are connected with the discharge-spout $d$ and the branch-pipe $d^1$ leading to the spout. The shaft $S^2$ is connected by its square lower end to the valve-disk $v$ and supported by a fixed collar $r$ on ball-bearings $r^1$ which are supported on a suitable bar arranged diametrically of the casing so as to support the shaft and permit the easy movement of the same by a hand-lever L, which is attached to the upper end of the shaft. By turning the lever through one-sixth of a rotation, the shaft and disk $v$ are likewise turned for one-sixth of a rotation so that the channels 1 and 2 are respectively placed in connection with the outlet-spout $d$ and syrup-discharge branch-pipe $d^1$, so that thereby the liquid from the tank T as well as the measured quantity from the syrup vessel are simultaneously discharged through the discharge-spout $d$ into the tumbler placed below the same, so that the measured quantity of carbonated liquid as well as the measured quantity of flavored syrup are mixed and supplied at the same time. In connection with the upper end of the shaft is arranged a coin-operated apparatus which permits at the proper time the release of the hand-lever L and a register R by which the number of actuations of the hand-lever L, and thereby of the measuring and dispensing apparatus, are counted, so that a certain control is given automatically to the sales made by the apparatus. The coin-delivery device is so arranged as to release the hand-lever by the dropping of the coin and permit the actuation of the vending device to discharge the carbonated liquid.

Each measuring and dispensing device for the carbonated liquid is connected with an independent cooling-coil $C^1$ and with an independent measuring cup for the carbonated liquid, all the measuring cups for the liquid being supported and arranged in the cooling-box so as to dispense the liquid in cool condition, while the measuring cups for the syrup are arranged outside. The apparatus shown in Fig. 1 is provided with four separate dispensing and measuring devices, each apparatus being capable of separate operation by supplying a coin and moving the hand-lever for setting the apparatus for permitting the discharge of the cooled, carbonated and flavored liquid. On the return of the hand-lever by motion corresponding to one-sixth of a rotation of the valve-disk, the connection with the measuring cups is established, so that the apparatus is then again ready for discharging the next quantity of liquid, and so on.

The advantages of the improved measuring and dispensing apparatus are that all the connections are made by only one valve and valve-casing, whereby the construction of the dispensing apparatus is greatly simplified and its operation made more reliable and effective, so that the apparatus cannot get as easily out of order as when a plurality of independent valves for the supply of liquids and syrups have to be operated. Another advantage is that when the required connections and the proper supply of liquids are made and the proper quantity of ice placed in the box, the measuring and dispensing device is ready for actuation.

Having thus described my invention, I desire to claim as new and secure by Letters Patent:

1. In a liquid dispensing device, the combination of a source of liquid under pressure, a discharge-spout, a measuring cup for the liquid, a syrup vessel, a syrup-measuring cup, a rotary valve comprising a single disk having ports to connect the liquid supply pipe and syrup vessel with the measuring cups and also having discharge-nozzles for the liquid and syrup, and means for actuating the valve for simultaneously filling the measuring cups and then discharging the contents of the same through the spout.

2. In a liquid measuring and dispensing device, the combination of a single valve-connection consisting of a valve-casing provided with ports and a disk provided with connecting-channels, means for moving said valve-disk in the valve-casing, a liquid supply tank, a liquid measuring cup, a syrup vessel, a syrup-measuring cup, a discharge-spout, a branch-pipe leading from the discharge-spout to one of the ports of the valve-connection, and pipes connecting said liquid-tank, syrup vessel, measuring cups and valve-connection for supplying by one movement of the valve the required quantity of liquids to the measuring cups and discharging the same on the return motion of the disk through the spout.

3. In a liquid measuring and dispensing device, the combination, with a source of liquid under pressure, of a syrup vessel, measuring cups for the liquid and the syrup, a valve-casing, a rotary valve-disk in said casing provided with channels, a discharge-spout for the liquid, connected with one of the ports of the valve-casing, a branch-pipe connected with the opposite port of said valve-casing, pipes connecting certain of the remaining ports of the valve-casing with the liquid and syrup measuring cups, and pipes connecting said syrup vessel and said source of liquid with the other ports of said valve-casing.

4. In a liquid dispensing apparatus, in combination, a source of liquid, a syrup vessel, a syrup-measuring cup, a liquid-measuring cup, a valve-casing having a plurality of ports arranged in the wall thereof, a rotary valve-disk mounted in said valve-casing and provided with a series of peripheral ports adapted to register with those of said valve-casing, there being interior channels in said valve-disk which connect certain adjacent ports thereof, a discharge-spout connected to one of the ports of said valve-casing, a branch-pipe connected to said discharge-spout and to another of the ports of said valve-casing, connections between said measuring cups and certain other ports of said valve-casing, and connections between said supply vessel and said source of liquid and the remaining ports of said valve-casing.

In testimony, that I claim the foregoing as my invention, I have signed my name in presence of two subscribing witnesses.

JOHN P. MUTH.

Witnesses:
PAUL GOEPEL,
HENRY J. SUHRBIER.